United States Patent [19]

Mansfield, Jr.

[11] Patent Number: 5,066,939

[45] Date of Patent: Nov. 19, 1991

[54] METHOD AND MEANS OF OPERATING A POWER LINE CARRIER COMMUNICATION SYSTEM

[76] Inventor: Amos R. Mansfield, Jr., 4080 Devonshire Dr., Provo, Utah 84604

[21] Appl. No.: 416,852

[22] Filed: Oct. 4, 1989

[51] Int. Cl.⁵ .......................................... H04M 11/04
[52] U.S. Cl. ........................ 340/310 R; 340/310 A; 340/310 CP; 379/167
[58] Field of Search ........ 340/310 CP, 310 R, 310 A; 379/167

[56] References Cited

U.S. PATENT DOCUMENTS

| | | | |
|---|---|---|---|
| 3,810,096 | 5/1974 | Kabat et al. | 340/310 CP |
| 3,911,415 | 10/1975 | Whyte | 340/310 A |
| 4,057,793 | 11/1977 | Johnson et al. | 340/310 R |
| 4,058,678 | 11/1977 | Dunn et al. | 340/310 CP |
| 4,357,598 | 11/1982 | Melvin, Jr. | 340/310 A |
| 4,408,186 | 10/1983 | Howell | 340/310 R |
| 4,442,319 | 4/1984 | Treidl | 340/310 R |
| 4,473,817 | 9/1984 | Perkins | 340/310 R |

Primary Examiner—Donnie L. Crosland
Attorney, Agent, or Firm—Robert T. Dunn

[57] ABSTRACT

A power line carrier (PLC) communication system operating on a conventional three wire (Hot (H), Neutral (N) and Ground (G) wires) power line uses more than one of the several RF transmission lines that are defined by the three wire power line to improve communication between units of the PLC system. According to a first embodiment a PLC system transmitter sends out of phase RF signals across the H and G wires and across the N and G power wires to the PLC system receiver, which receives and combines both of the out of phase transmissions, and so even if one of these paths is severely attenuated, the other path can deliver a sufficiently strong RF signal to the receiver for effective communications. According to another embodiment three different pairs of the H, N and G wires of the power line are selected in sequence for transmission of the PLC system RF and the pair that results in the best communication between a system transmitter and receiver is used for continuing communication. Also included is a PLC telephone extension system for which there is full duplex communication between each of the extension telephones of the system at different locations in the premises and the premises telephone line.

33 Claims, 4 Drawing Sheets

METHOD AND MEANS OF OPERATING A POWER LINE CARRIER COMMUNICATION SYSTEM

BACKGROUND OF THE INVENTION

This invention relates to power line carrier (PLC) communication systems and more particularly to a method and means of improving communication between the system units on a conventional power line.

A typical PLC system in a building utilizes the existing power distribution system in the building as transmission lines. The usual power distribution system in a building is a systems of wires, electric outlet receptacles, fuses and/or circuit breakers, switches and controls and permanently wired fixtures and appliances, installed for the purpose of distributing low frequency, 50 or 60 Hertz (Hz) alternating current (AC) power in the building. For a PLC system, this existing power distribution system provides the electrical path for non-power related radio frequency (RF) carrier transmissions modulated in some manner in order to transmit voice and/or data individually or in combination from one location in the building to another. These carrier signals are transmitted throughout the building via the existing power distribution system simultaneously with the transmission of the low frequency power.

In a PLC system, a transmitter generates modulated RF carrier signals at one location in the building, which are coupled to the existing power distribution system via an appropriate coupling network, usually at an electric outlet receptacle at that location, and a receiver at another location receives and demodulates the RF carrier providing the desired transmission of voice and/or data signals from the one location to the other.

In the United States, the usual source of electric power is the local Electric Power Company which generates and/or distributes three phase, 60 Hz alternating current (AC) power and supplies each subscriber electric power at one, two or three phases on two to four power wires of a power line to the subscriber's premises. Within the building, the subscriber usually provides the power distribution system. In the usual dwelling that may be a house, apartment, condominium, etc., and in small business and industrial buildings, the Power Company supplies two phases of 60 Hz on three wires: a first hot wire at phase one, a second hot wire at phase two and a neutral wire. Usually, the voltage across each of the hot wires and neutral is 110 volts AC (VAC) and across the two hot wires is 220 VAC. Also, usually, an effort is made when installing the power distribution system to supply part of the premises with 110 VAC at phase one, part with 110 VAC at phase two and a few locations in the premises with 220 VAC in such a way that the likely loads in the premises are evenly balanced on phases one and two. Also, usually in a dwelling and in small buildings, there are no power transformers in the distribution system.

Large electric power subscribers (usually business or industrial) may be provided by the Power Company at their building (or premises) power line voltage greater than 110 VAC at two or three phases. For those subscribers the power distribution system must include transformers in order to feed conventional 110 VAC outlets, fixtures and appliances in the building.

Clearly, PLC systems depend on the power wiring of the power distribution system in a building to perform as transmission lines to convey RF signals between units plugged into the power wiring. A transmission line is most efficient when it appears as a constant impedance at every point along its path. This is not the case with the usual power wiring in a premises, since the usual power wiring layout for a premises is a random distribution of branches from a common distribution panel and each branch has devices of widely varying impedances connected at random points. Furthermore, even though power wiring has standardized on three wire (H, N and G wires) power lines for 110 VAC during the past few decades, devices are often connected to the system by connection to only two of the three wires.

At present, in order for a PLC system to transmit and receive information effectively at all desired locations in the subscriber's building the transmitted power launched into the subscriber's power distribution system must often be so great that the RF radiation therefrom exceeds the power permitted by the Federal Communications Commission (FCC) regulations. An alternative to this has been to transmit lower RF power so as not to exceed FCC regulations and install special AC power line coupling devices throughout the building at distribution panels and at transformers and phase separation and protection networks. The results of these efforts are not entirely satisfactory and in many cases the only way to make the PLC system effective is to transmit greater RF power, and so exceed the FCC regulations.

PLC systems also have problems overcoming severe noise and signal losses associated with the power distribution system of the premises. The most severe signal attenuations are caused by devices plugged into the power line between two PLC units, as those devices shunt the PLC system signals and thus reduce the signal transmission between the units. For PLC system signals to overcome the noise levels existing on power lines, it is essential that the RF signals he received at a level that overrides the noise at the receiver. The governmental rules and regulations against excessive radiation of radio frequency signals sets an effective upper limit on the amount of power that can be used by a carrier current transmitter, thus making it necessary to use means to minimize losses and transfer as strong a signal as possible.

The usual power distribution system in a small premises, such as a dwelling, supports many services that connect only to the hot and neutral power wires (H and N) for their power, the ground wire (G) being reserved for safety connection to exposed conducting surfaces. PLC systems that use the hot and neutral wires for communication suffer from signal loss due to the shunting effect of other devices connected to these same two wires of the power distribution system. Several PLC systems have used the neutral and ground leads as the transmission conductors to attempt to overcome this shunting effect. This is not always effective since there is no assurance of consistency in wiring installations. In some cases, ground and neutral wires (G and N wires) are connected together in more than one place in the premises. Most often the G and N wires are connected together in the distribution system junction box. Obviously, shorted conductors will not effectively transfer radio signals along their path.

SUMMARY OF THE INVENTION

Accordingly, an object of the present invention is to provide a PLC system with improved reliability and performance.

Another object is to provide a PLC system that transmits over more than one power line path between the system units.

A related object of this invention is to provide a PLC communication system with a selection of power line transmission paths between a transmitter and receiver of the system.

Another object of the invention is to provide a PLC communication system with two or more selectable transmission paths between the system units.

It is another provide a PLC system wherein at least some of the disadvantages of the prior PLC avoided.

The present invention takes advantage of additional transmission paths provided by the existing power wires that may have less loss between the PLC system units than the path over the "hot" (H) and neutral (N) wires that is usually used. Prior PLC art has taught strategies to overcome noise by using particular modulation and/or demodulation schemes, but has not addressed the RF transmission line characteristics that are encountered on power lines of the usual power distribution system in a small premises, such as a dwelling. With increased use in a dwelling of electronic devices that generate RF noise, electronic filtering is much more common than in the past. Many of the components used in these filters have a resonating effect in conjunction with lengths of the power line, that in turn, can dramatically change the impedance at particular locations along the power line. These points can vary from effective shorts to extremely high impedances. A PLC system transmitter cannot effectively transfer power to either extreme, nor can the PLC system receivers efficiently accept input signals in these cases when their inputs have been designed for a more moderate impedance.

The most serious impact of the widely varying line conditions is the inability to anticipate which connections will be most effective for communication. In addition, tests have shown that it is quite possible that best results occur sometimes when the PLC system transmitter and receiver are not connected to the same pair of power line wires.

The present invention contemplates several methods of adding diversity to a PLC system transmission path where the power lines in the premises have three wires, hot (H), neutral (N) and ground (G). One method applies out of phase RF transmitter signals across the H and G wires and across the N and G wires. For example, $RF^+$ is applied across the H and G wires and $RF^-$ is applied across the N and G wires. Conversely the receiver is connection to both paths. Even if one of these paths is severely attenuated, the other path can deliver a sufficiently strong signal for effective communications. Another method utilizes three different pairs that are available with the H, N and G wires of the power line. According to that method a selector switch for selecting the path is provided at the transmitter and at the receiver to allow selection at each end of the transmission path to whichever pair of power line wires provides the best communication, which is usually the least attenuation.

A particular embodiment of the present invention described herein is a PLC telephone extension system for which there is full duplex communication between each of the extension telephones of the system at different locations in the premises and the premises telephone line The PLC telephone extension system described herein uses frequency modulation (FM) of multiple carriers. However, there is nothing to preclude application of the techniques of the present invention to an amplitude modulation (AM) system with multiple carriers for the same sort of advantage and improvement in communications, or any other system of carrier communication with one or multiple carriers.

DESCRIPTION OF EMBODIMENTS OF THE INVENTION

Conventional Small Premises Power Distribution System

Figure 1:
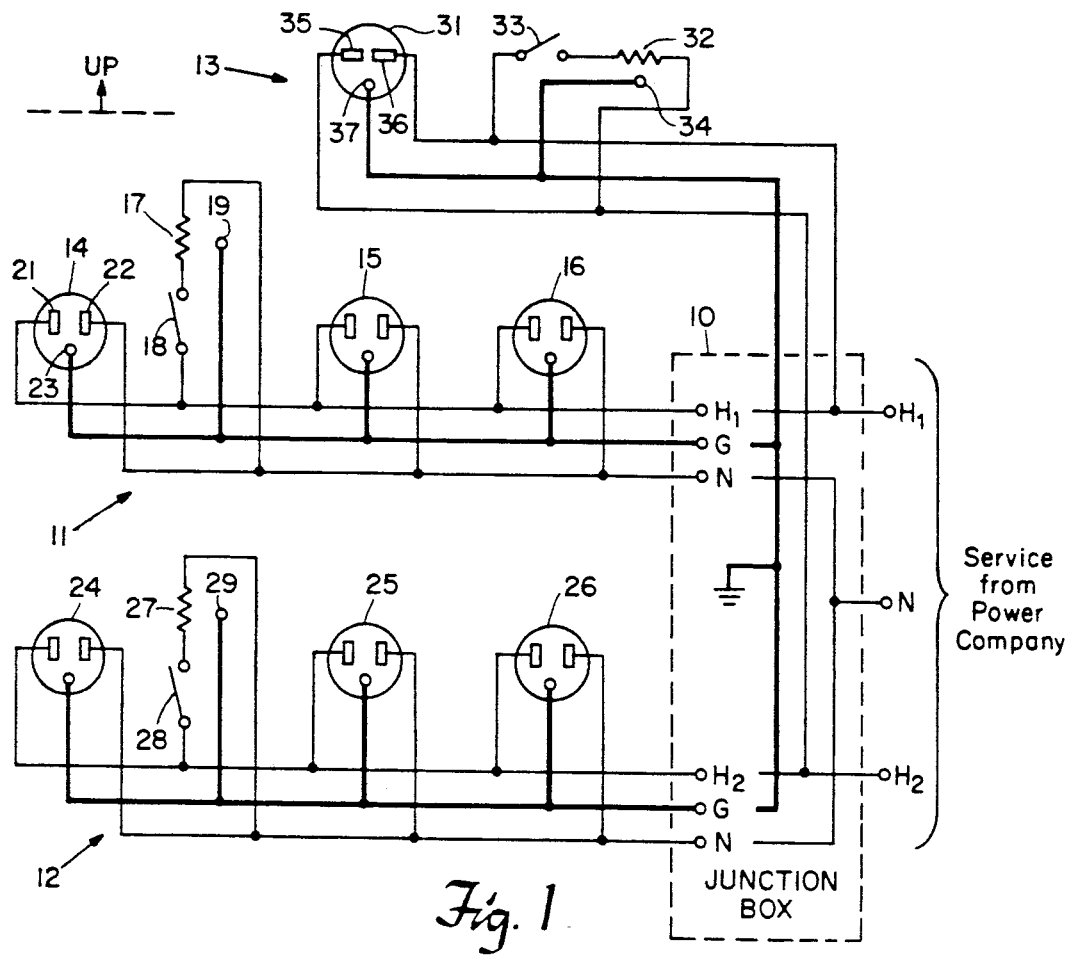
FIG. 1 is an electric diagram illustrating a typical or usual electric power distribution system in a small premises, such as a dwelling, where the power lines have three wires (H, N and G wires) that connect to all receptacles, fixtures, etc , and two phases of 110 volts alternating current (VAC) are provided by the Power Company to the premises.

FIG. 1 illustrates a conventional two phase 110 VAC power distribution system in a small premises. The system may have several 110 VAC power lines on each of the two phases and at least one 220 VAC power line. Service from the Power Company includes: two "hot" wires, H1 at 110 VAC at phase one and H2 at 110 VAC at phase two; and a neutral wire N. The Power Company line includes wires H1, H2 and N and is called the power service line. It is provided to the premises service junction box 10 and feeds all of the 110 VAC and 220 VAC power lines in the premises, like 110 VAC phase one line 11, 110 VAC phase two line 12 and 220 VAC line 13.

Junction box 10 usually contains the main service circuit breaker (or fuse) and a circuit breaker (or fuse) for each of the power lines like lines 11, 12 and 13. No circuit breakers or fuses are shown in the drawings herein in order to simplify the illustrations. Ground (G) is also provided at the junction box and may be established by an earth ground of the premises. Thus, the distribution system includes several 110 VAC phase one lines like 11, each including an H1, an N and a G wire, several 110 VAC phase two lines like 12 each including an H2, an N and a G wire and at least one 220 VAC line like 13 including an H1, an H2 and a G wire.

Line 11, for example feeds three conventional three connector receptacles 14, 15 and 16 and a fixture represented by impedance 17, controlled by switch 18 and having a grounded part 19. Conventional 110 VAC receptacles like 14 have two terminal sockets that are accessed by external opposing slits 21 and 22 to accept the blade prongs of a conventional mating plug. They also have a ground socket accessed by a round hole 23, usually below and between the slits as shown to accept the round ground prong of the conventional plug. The receptacles are usually mounted in a wall of the premises and connect to the power line that is carried in the wall so that as viewed upright by the user, the terminal through the left slit, like 21 is "hot" (it connects to the power line H1 wire), the terminal through the right slit, like 22 connects to the power line N wire and the terminal through the round hole 23 connects to the G wire. All of the receptacles of line 11 are connected to line 11 wires in this way. Also, all of the conventional receptacles 25 and 26 of line 12 are connected to that line in this way. Line 12 also feeds a fixture impedance 27 controlled by switch 28 and having a fixture ground 29.

The 220 VAC line 13 feeds a conventional 220 VAC receptacle 31 and a 220 VAC fixture impedance 32 controlled by switch 33 and having a fixture ground 34. Receptacle 31 has two terminal sockets that are accessed by external end to end slits 35 and 36 to accept the blade prongs of a conventional 220 VAC mating plug. They also have a ground socket accessed by a round hole 37, usually below and between the slits as shown to accept the round ground prong of the conventional 220 VAC plug. Such a receptacle is usually mounted in a wall of the premises and connect to the power line that is carried in the wall so that as viewed upright by the user, the terminal through the left slit 35 connects to the 220 VAC power line H1 wire, the terminal through the right slit 36 connects to the power line H2 and the terminal through the round hole 37 connects to the power line G wire.

The usual power distribution system in a small premises, such as a dwelling, supports many services that connect only to the hot and neutral power wires (H and N) for their power, the ground wire (G) being reserved for safety connection to exposed conducting surfaces. PLC systems that use the hot and neutral wires for communication suffer from signal loss due to the shunting effect of other devices connected to these same two wires of the power distribution system. Several PLC systems have used the neutral and ground leads as the transmission conductors to attempt to overcome this shunting effect. This is not always effective since there is no assurance of consistency in wiring installations. In some cases, ground and neutral wires (G and N wires) are connected together in more than one place in the premises. Most often the G and N wires are connected together in the distribution system junction box. Obviously, shorted conductors will not effectively transfer radio signals along their path.

First Embodiment—PLC Two Phase RF Transmission

The usual PLC system coupling to the power distribution system in a subscriber's premises is at the available 110 VAC receptacles, because they are numerous and accessible throughout the premises. The PLC system unit transmitter and/or receiver simply plugs into the nearest receptacle and it has a conventional power line plug for that purpose. Other units of the PLC system may plug into other receptacles in the premises in the same way to carry out the purposes of the PLC system. Thus, all communication between units of the PLC system is over the power distribution system and all coupling of PLC units is at conventional 110 VAC receptacles with conventional plugs.

Figure 2:
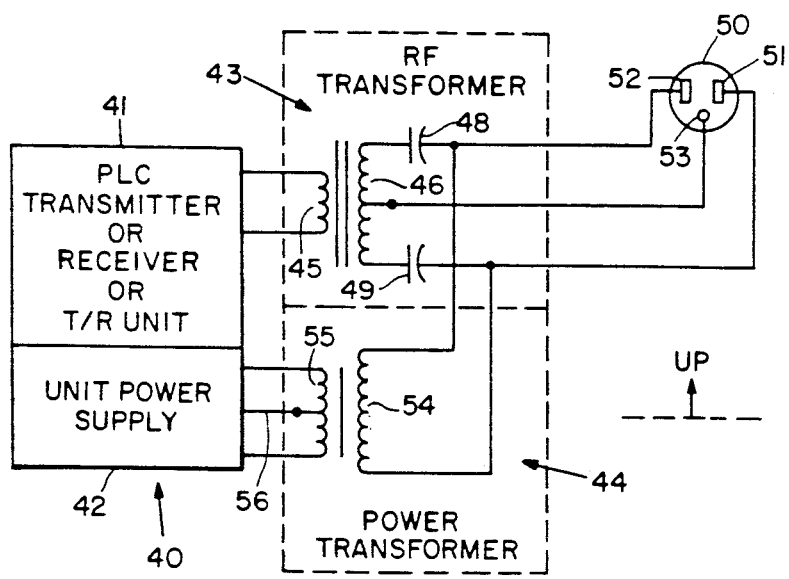
FIG. 2 is an electric diagram illustrating a unit of a PLC system for use on the power distribution system of FIG. 1 incorporating the first embodiment of the present invention, to wit: transmission of two phases of RF on different RF transmission line pairs of the power line wires and receiving both transmission simultaneously at a PLC system receiver.

A PLC unit for transmitting two phases of RF over the power line in accordance with the first embodiment of the present invention is shown in FIG. 2. It includes a two phase RF signal coupling transformer to the blades and round prongs of the unit conventional plug. As shown, the unit 40 includes a transmitter, receiver or T/R section 41 and a power supply section 42, a two phase RF transformer 43 between section 41 and the unit plug 50 and a power transformer 44 between the unit power supply and the plug. From the prong side of plug 50, as shown in FIG. 2, projects the terminal blades 51 and 52 and round ground prong 53. This plug fits any of the 110 VAC receptacles shown in FIG. 1. For example, plug 50 plugs into receptacle 14 with blade 51 in terminal slit 21, blade 52 in terminal slit 22 and round prong 53 on hole 23.

The two phase RF transformer 43 includes a T/R unit coil 45 and a center tapped power line coil 46 of which one end connects to the H wire of the receptacle power line through RF coupling capacitor 47 and the other end connects to the N wire through RF coupling capacitor 48 and the center tap 49 connects the G wire of the power line. This method applies out of phase RF transmitter signals across the H and G wires and across the N and G wires. For example, RF+ is applied across the H and G wires and RF− is applied across the N and G wires. Conversely the receiver is connection to both paths. Even if one of these paths is severely attenuated, the other path can deliver a sufficiently strong signal for effective communications.

The PLC unit power supply 42 is fed by power transformer that has its primary coil 54 connected directly across the H and N wires of the power line and the secondary coil 55 may have a center tap 56 so that it supplies two phases of 110 VAC line power to the supply.

Second Embodiment—PLC RF Power Line Path Selection

Figure 3:
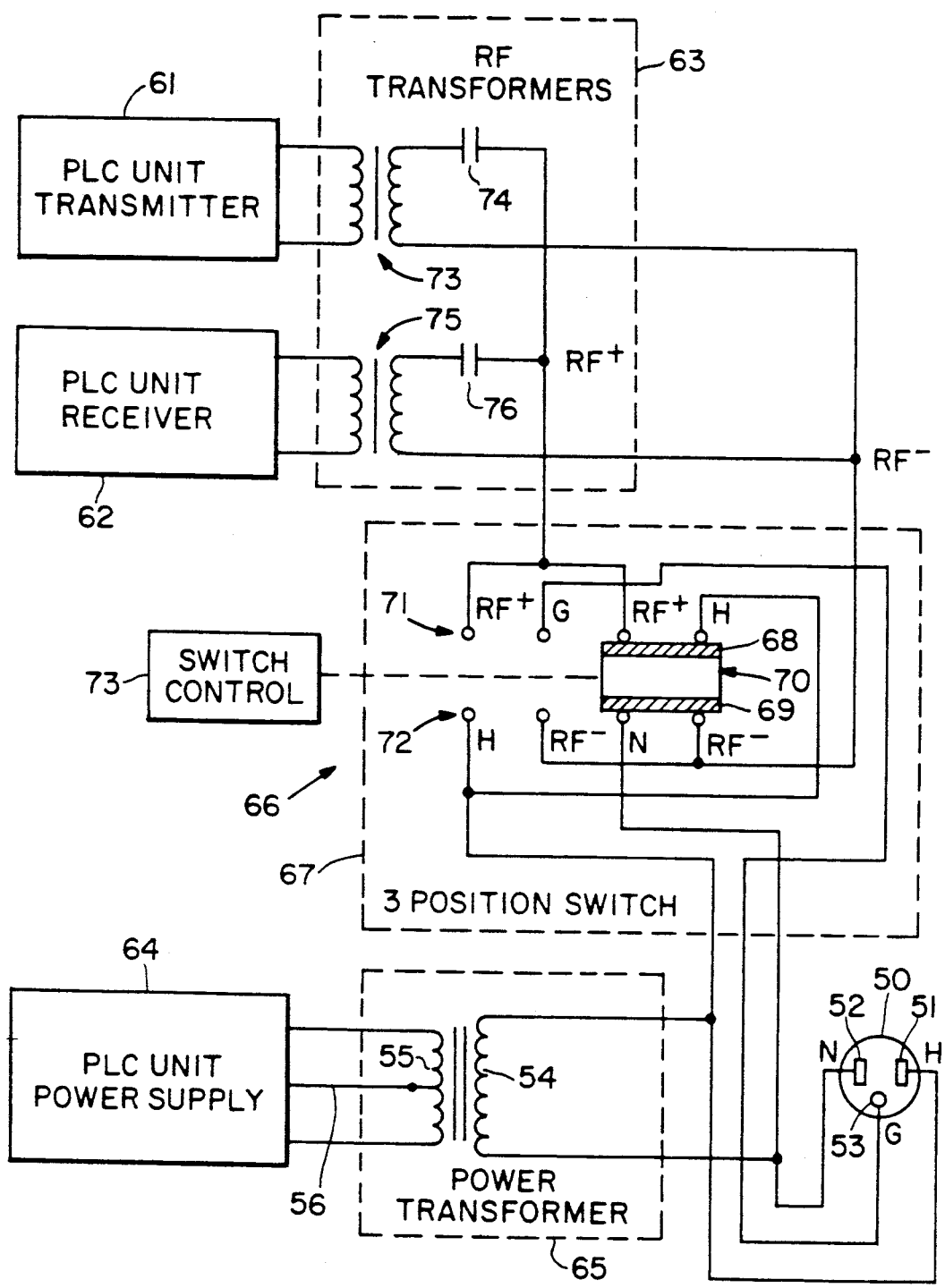
FIG. 3 is an electric diagram illustrating a transmit/receive (T/R) unit of a PLC system for use on the power distribution system of FIG. 1, incorporating the second embodiment of the present invention, to wit: selecting among three RF transmission line paths available at each transmitter and corresponding receiver of the PLC system.

Another embodiment of the present invention is illustrated in FIG. 3. It incorporates a method and means of selecting a pair of wires among the three (H, N and G) of the 110 VAC power line. Clearly, there are three combinations of these three wires: H and N, H and G and N and G. As shown in FIG. 3, the PLC unit includes a transmitter 61, receiver 62, RF transformer 63, power supply 64, power supply transformer 65 and conventional 110 VAC power line plug 50 for connection to the power line receptacle. The power transformer connects directly to the plug blades 51 and 52. Between the RF transformers and the plug is a switching system 66 by which the user (or an automatic control) selects the power line wire combination for transmission from the PLC unit and reception by the unit. Thus, the switching system select the wire combination H and N, or H and G, or N and G.

Switching system 66 in this example includes a three position slide switch 67 having eight terminals in two parallel rows 71 and 72 of four terminals each, connected as shown, and a slide contact 70 that carries shorting bars 68 and 69 that slide along terminal rows 71 and 72, respectively. The RF lines from RF transformers 63 are denoted RF+ and RF− indicating plus and minus phases of the RF, and connect as shown to the slide switch terminals so marked. The rest of the slide switch terminals are marked H, N or G and, accordingly connect to the H, N or G prongs of plug 50.

In operation, slide 70 is moved to each of three positions by control 73. For example, the slide is manually positioned by the user to the position shown in the Figure to connect switch terminals RF+ to H and RF− to N. The user then evaluates PLC communication with the switch in that position. Then the switch is moved to the adjacent position at which switch terminal RF+ connects to H and RF− connects to N and the user evaluates PLC communication with the switch in that position. Then the user moves the switch to the last position at which switch terminal RF+ connects to G and RF− connects to H and the user evaluates PLC communication with the switch in that position. Having made those evaluations, the user can then select the switch position the results in PLC communication to his liking, usually the best quality communication. If the PLC system is a voice communication system or a telephone extension system the best quality is usually where voice is clearest.

In this embodiment, the RF transformers 63 are each single RF phase and include transmitter transformer 73 that couples RF from the transmitter from one end of transformer 73 through RF coupling capacitor 74 to switch 67 as RF+ and from the other end of the transformer to the switch as RF−. Similarly, receiver transformer 75 couples RF+ from the switch through RF coupling capacitor 76 to one end of the receiver transformer and RF− from the switch to the other end of the transformer.

The power transformer 65 may be the same as power transformer 44 shown in FIG. 2 and bears the same reference numbers on the parts thereof.

Conventional Power Distribution System—Improper Connections

Figure 5:
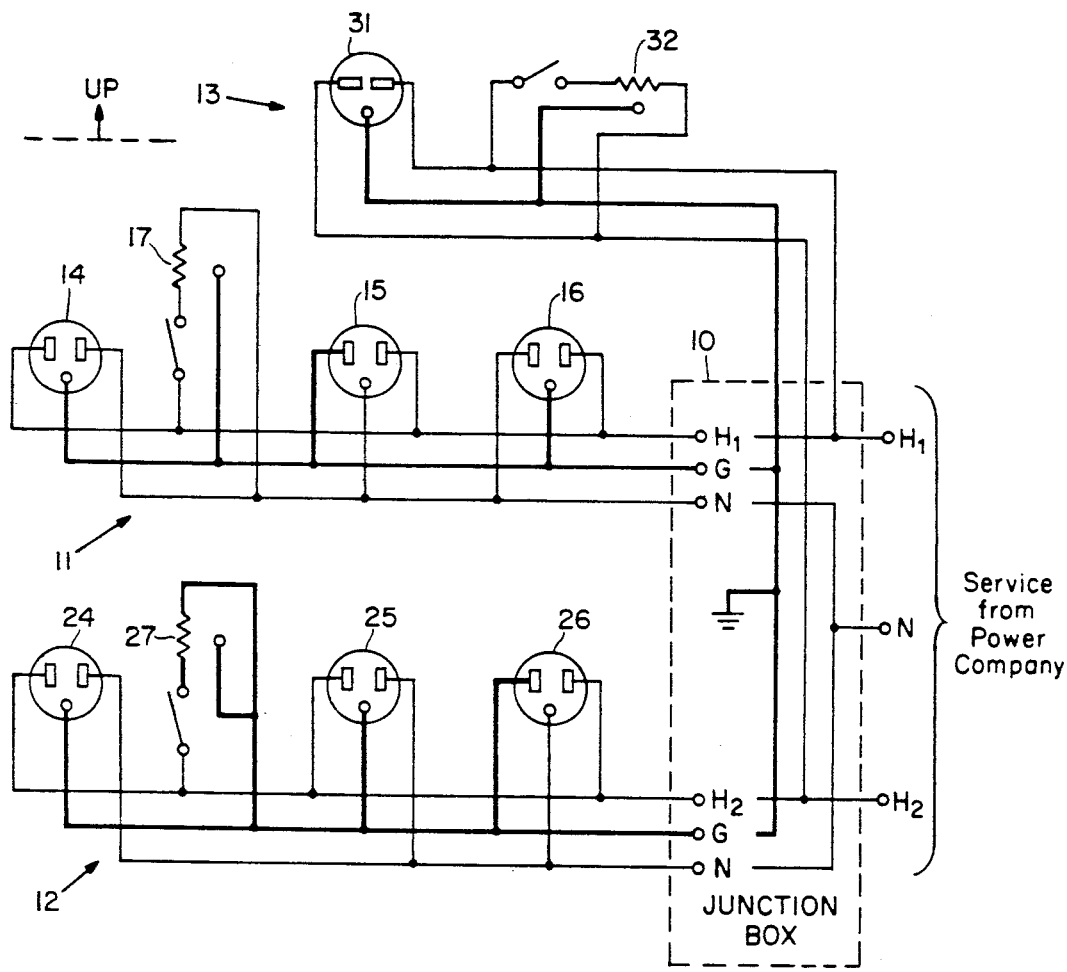
FIG. 5 is an electric diagram illustrating the same electric power distribution system as illustrated in FIG. 1, but with some of the receptacles and fixtures connected to the three wire power line with G and N crossed and/or with G connected to the N terminal and/or with N grounded at both ends of the power distribution system, even though such connections are in violation of some building codes.

FIG. 5 shows the same small premises power distribution system as shown in FIG. 1, but with some of the 110 VAC receptacles and fixtures improperly connected to the power lines. For example: receptacle 16 crosses the H and N connections so that N is on the left and H is on the right; receptacle 16 also connects H to the right terminal and in addition crosses N and G; receptacle 26 is connected improperly just like receptacle 15; and fixture 27 is connected across H and G instead of across H and N. None of these improper connections are so bad that the power distribution system short circuits or will not work. However, they do introduce unknows and variables that must be dealt with by the PLC system designer whose products are supposed to operate satisfactorily in substantially all premises power distribution systems.

These variables add to various RF shorts and open circuits at the receptacles contributed by all manner of electrical devices that are found in a typical premises and interfering RF launched into the power distribution system by those devices. The embodiments of the present invention afford the PLC system alternatives to the problems introduced by improper connections such as shown in FIG. 5 and the RF impedance variables caused by them and by electrical devices

PLC Extension Telephone System

An application of the present invention that yields substantially improved performance can be made to a power line carrier (PLC) extension telephone system. Such a system is described in U.S Pat. No. 3,949,172 entitled "Telephone Extension System Utilizing Power Line Carrier Signals" which issued Apr. 6, 1976 to Brown, et al and U.S. Pat. No. 4,495,386 entitled "Telephone Extension System Utilizing Power Line Carrier Signals" which issued Jan. 22, 1985 to Brown, et al . The first patent describes a system as shown herein in FIG. 4.

Figure 4:
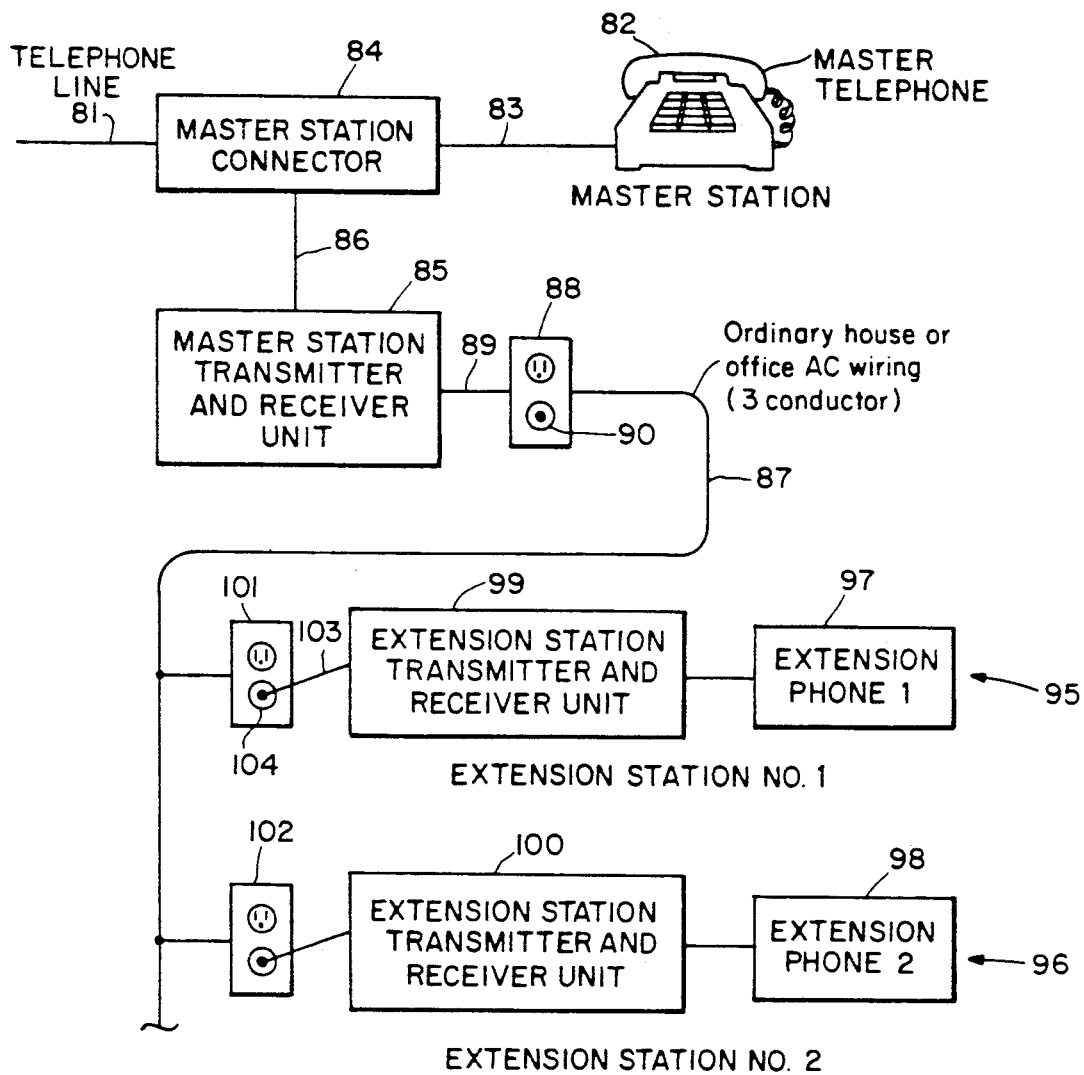
FIG. 4 is a pictorial representation of a PLC extension telephone system including two extension telephones which communicate with the Telco telephone line of the premises, via the available AC power distribution system of the premises and incorporating failures of the present invention for improved performance PLC system.

As shown in FIG. 4, the subscriber's telephone line 81 and the subscriber's on-line telephone 82 are of conventional design and may be purchased at retail or provided by the local Telephone Company (Telco). The subscriber's telephone is on the line at all times and is energized by direct current over the telephone line from the Telco switching system. Both the Telco telephone line 81 and the premises telephone line 83 from telephone 82 connect together through a conventional telephone line connector 84.

A master station transmitter-receiver (TR) unit 85, connects directly to the premises 110 VAC three conductor wire (H, N and G) power system 87 at a conventional power receptacle 88 and includes a three wire power cord 89 and plug 90 from the master unit that plugs into the receptacle. In the master TR unit is a transmitter and a receiver, each incorporating features of the present invention and each functioning as a PLC system with a corresponding receiver and a corresponding transmitter at an extension station, like extension station 95.

For purposes of example, two extension stations 95 and 96 are shown for extension phones 1 and 2 (97 and 98) that each include a transmitter-receiver unit 99 and 100 that plug into the AC power line via conventional three terminal (H, N and G) power receptacles 101 and 102, respectively. The power receptacle terminals are conventional, as described above with respect to FIG. 1, and connect to the H, N and G wires of power system 87. Several extension stations can be added and all can be on the power line at the same time. Furthermore, all the extension stations may be constructed the same, but they may be operated differently. For example, for full duplex telephone operation, they may all receive the same frequency band (the master channel) transmitted by the master unit, but each may transmit a different frequency band (extension band channels 1, 2, etc.) to the master unit.

The transmitter of the master station TR unit 85 operates at one frequency and is received by the receiver in the extension units (99 and 100). The transmitters in the extension units operate on a frequency separated sufficiently from the frequency of the master station units to prevent interference between units. Thus, the receivers in the master station units are tuned to receive the extension units transmissions and, conversely, the receivers in the extension units are tuned to the transmission frequencies of the master unit transmitter.

The operation radio frequencies of the transmitters and receivers may be selected from anywhere in the range of 100 Khz to several Megahertz. An essential requirement is a pair of frequencies that generate minimum spurious products when beat together and that have sufficient separation to allow filters in each receiver to isolate the transmitted signals from the desired received signal. In the present embodiment, frequency pairs of: 345 Khz and 485 Khz; and 2400 Khz and 3300 Khz are suitable.

The master and each extension TR unit each includes a transmitter and a receiver incorporating features of the present invention and both the transmitter and the receiver of each unit couple to the AC power line 87 by a three wire (wires H, N and G) power cord and plug that plugs into the station power line receptacle, like power cord 103 and plug 104. The extension telephone at each extension station may be a conventional phone that can also be used directly on the telephone line. In the PLC system shown in FIG. 4, the telephone connects directly to the extension TR unit by a length of conventional telephone line that carries relatively low level voltage, voice, ring, dial, etc. signals between the extension phone and the Telco telephone line to enable all uses of the extension telephone that are normally available to a conventional telephone. Hence the TR unit is a "transparent" transmission system between the extension telephone and the Telco line.

Clearly, the extension telephones 97 and 98 with their TR units can be installed easily in a subscriber's premises by simply plugging into the available AC power outlets. There is no intrinsic limitation on the number of extension phones that can be employed on the AC power line at any one time, however there are practical limitations including interference if a large number of extension phones were all used at the same time. The use of two phase RF transmission as described herein with reference to FIG. 2, or the use of the switching system for selecting among three power wire combinations as described herein with reference to FIG. 3, at the telephone master and extension stations improves communication between them. Using these techniques PLC systems can be operated with satisfactory communication between units of the system without exceeding the FCC regulations on radiated RF power.

The several embodiments of the present invention described herein are all three wire power line carrier (PLC) communication systems that include more than one RF transmission path over the available power line, between units of the PLC system. The method and means of transmission and reception carried out in each of these embodiments are specific adaptations of the invention to the embodiments. It will be clear that variations of the details of construction and operation may be carried out without departing from the spirit and scope of the invention as defined in the appended claims.

What is claimed is:

1. A power line carrier (PLC) communication system for operation on an electric power distribution system in a premises wherein said power distribution system includes one or more power lines having three wire conductors comprising:
   (a) a transmitter unit of said PLC system for transmitting radio frequency (RF) signals over said power line;
   (b) a receiver unit of said PLC system for receiving said transmitted RF signals from said power line,
   (c) means at said transmitter unit for selectively coupling said RF signals to one pair of two or more different pairs of said power line three wire conductors, and
   (d) means at said receiver unit for coupling said RF signals from two or more different pairs of said power line three wire conductors to said receiver unit.

2. A PLC system as in claim 1 wherein,
   (a) said different pairs of said transmission line three wire conductors each form a two wire RF transmission line.

3. A PLC system as in claim 1 wherein,
   (a) said power line three wire conductors are contained side by side and coextending in said power line.

4. A PLC system as in claim 3 wherein,
   (a) said power line three wire conductors are substantially electrically insulated from each other in said power line.

5. A PLC system in claim 3 wherein,
   (a) said transmitter unit coupling means includes inductively coupled elements of which one element connects to the RF output of said transmitter and the other element connects to one pair of said power line three wire conductors.

6. A PLC system as in claim 3 wherein,
   (a) said coupling means at said receiver unit includes inductively coupled elements of which one element connects to the RF input of said receiver unit and the other element connects to one pair of said power line three wire conductors.

7. A PLC system as in claim 3 wherein,
   (a) said electric power distribution system is an alternating current (AC) system,
   (b) said transmitter unit includes a power supply, and
   (c) said transmitter unit power supply input is coupled to said power line by inductively coupled elements of which one element connects to said power supply input and the other element connects to a pair of said power line three wire conductors.

8. A PLC system as in claim 3 wherein,
   (a) said electric power distribution system is an alternating current (AC) system powered by a two wire source including a high voltage AC (VAC) wire (H wire) and a neutral wire (N wire) and said power line three wires include an H wire, an N wire and a ground wire (G wire).

9. A PLC system as in claim 8 wherein,
   (a) said different pairs of power line wires include: the H and G wires and the N and G wires.

10. A PLC system as in claim 8 wherein,
    (a) said different paris of power line wires include: the H and G wires, the N and G wires; and the H and N wires.

11. A PLC system as in claim 10 wherein,
    (a) means are provided at said transmitter unit operating in conjunction with said coupling means for coupling said RF signals selectively to said H and N wires, or said H and G wires, or said N and G wires, (b) whereby operation of said PLC system is selective as to the pair of power line wires said PLC system transmits over.

12. A power line carrier (PLC) communication system for operation on an AC electric power distribution system in a premises wherein said power distribution system includes one or more power lines having a higher AC voltage wire (H wire), a neutral wire (N wire) and a ground wire (G wire) comprising, (a) a transmitter unit of said PLC system for transmitting radio frequency (RF) signals over said power line, (b) a receiver unit of said PLC system for receiving said transmitted RF signals from said power line, (c) means at said transmitter unit for coupling said RF signals to two or more different pairs of said power line three wire conductors, (d) means at said receiver unit for coupling said RF signals from two or more different pairs of said power line three wire conductors to said receiver unit and (e) said transmitter unit produces different phases of said RF signals and said RF coupling means couples one of said RF phases to said H and G wires and the other RF phase to said N and G wires, (f) whereby said different RF phases are simultaneously transmitted to said receiver unit over different RF transmission lines of said power line wires.

13. A PLC telephone extension system for carrying signals between, a subscriber's telephone line of a public telephone communication system and said subscriber's extension telephone, over said subscriber's AC power distribution system that includes one or more power lines having three wire conductors, comprising:

(a) a master location near said telephone line and said AC power distribution system, (b) an extension telephone location near said AC power distribution system, and at said master location;

(c) a telephone line signal detector circuit having its input electrically connected to said telephone line and producing telephone line information signals, (d) a master carrier radio frequency (MRF) signal generator, (e) means for modulating said MFR with said information signals and (f) means for selectively coupling said modulated MRF to one pair of two or more different pairs of said power line three wire conductors; and at the extension location:

(g) an extension telephone, (h) means for receiving said MRF including means for coupling said MRF from two or more different pairs of said transmission line three wire conductors, (i) means for demodulating said received MRF producing an output therefrom representative of said information signals, and (j) means for coupling said demodulating means output to said extension telephone, (k whereby said extension telephone receives said telephone line information signals.

14. A PLC telephone line extension system as in claim 13, further including, at said extension location:

(a) a power supply providing power to said extension telephone, whereby said extension telephone generates extension information signals, (b) an extension carrier radio frequency (ERF) signal generator, (d) means for modulating said ERF with said extension information signals, (e) means for selectively coupling said modulated ERF to one pair of two or more different pairs of said power line three wire conductors; and at said master location;

(f) means for receiving said modulated ERF including means for coupling RF signals from two or more different pairs of said power line three wire conductors, (g) means for demodulating said received ERF producing an output signal representative of said extension information signal and (h) means for coupling said last mentioned output signal to said telephone line, (i) whereby said telephone line receives said extension information signal.

15. A PLC telephone extension system as in claim 13 wherein, (a) said different pairs of said transmission line three wire conductors each form a two wire RF transmission line.

16. A PLC telephone extension system as in claim 13 wherein, (a) said power line three wire conductors are contained side by side and coextending in said power line.

17. A PLC telephone extension system as in claim 16 wherein, (a) said power line three wire conductors are substantially electrically insulated from each other in said power line.

18. A PLC telephone extension system as in claim 16 wherein, (a) said master transmitter coupling means includes inductively coupled elements of which one element connects to the MRF output of said master transmitter and the other element connects to one pair of said power line three wire conductors.

19. A PLC system as in claim 16 wherein, (a) said coupling means at said extension receiver includes inductively coupled elements of which one element connects to the MRF input of said extension receiver and the other element connects to one pair of said power line three wire conductors.

20. A PLC telephone extension system as in claim 16 wherein, (a) said electric power distribution system is an alternating current (AC) system, (b) said master transmitter includes a master power supply, and (c) said master transmitter power supply input is coupled to said power line by inductively coupled elements of which one element connects to said power supply input and the other element connects to a pair of said power line three wire conductors.

21. A PLC telephone extension system as in claim 16 wherein, (a) said electric power distribution system is an alternating current (AC) system powered by a two wire source including a high voltage AC (VAC) wire (H wire) and a neutral wire (N wire) and said power line three wires include an H wire, an N wire and a ground wire (G wire).

22. A PLC telephone extension system as in claim 21 wherein, (a) said different pairs of power line wires include: the H and G wires and the N and G wires.

23. A PLC telephone extension system as in claim 21 wherein,
 (a) said different pairs of power line wires include: the H and G wires, the N and G wires; and the H and N wires.

24. A PLC telephone extension system as in claim 23 wherein,
 (a) means are provided at said master transmitter operating in conjunction with said coupling means for coupling said modulated MRF signals selectively to said H and N wires, or said H and G wires, or said N and G wires,
 (b) whereby operation of said PLC telephone extension system is selective as to the pair of power line wires said PLC system transmits over.

25. A PLC telephone extension system for carrying signals between, a subscriber's telephone line of a public telephone communication system and a subscriber's extension telephone, over a subscriber's AC power distribution system that includes one or more power lines including a relatively high AC voltage wire (H wire), a neutral wire (N wire) and a ground wire (G wire) comprising:
 (a) a master location near said telephone line and said AC power distribution system,
 (b) an extension telephone location near said AC power distribution system, and
 at said master location:
 (c) a telephone line signal detector circuit having its input electrically connected to said telephone line and producing telephone line information signals,
 (d) a master carrier radio frequency (MRF) signal generator,
 (e) means for modulating said MRF with said information signals and
 (f) means for coupling said modulated MRF to two or more different pairs of said power line three wire conductors; and
 at said extension telephone location:
 (g) an extension telephone,
 (h) means for receiving said MRF including means for coupling said MRF from two or more different pairs of said transmission line three wire conductors,
 (i) means for demodulating said received MRF producing an output therefrom representative of said information signals and
 (j) means for coupling said demodulating means output to said extension telephone,
 (k) whereby said extension telephone receives said telephone line information signals; and
 (l) said master transmitter produces different phases of said MRF signals and said modulated MRF coupling means couples one of said MRF phases to said H and G wires and the other MRF phase to said N and G wires,
 (m) thereby said different MRF phases are simultaneously transmitted over different RF transmission lines of said power line wires.

26. In a power line carrier (PLC) communication system for operation on an electric power distribution system in a premises wherein said power distribution system is an alternating current (AC) system powered by a two wire source including a high voltage AC (VAC) wire (H wire) and a neutral wire (N wire) and includes one or more power lines that include an H wire, an N wire and a ground wire (G wire) the method of operation including the steps of:
 (a) generating radio frequency (RF) signals at a first station,
 (b) selectively coupling said RF signals to one pair of two or more different pairs of said power line H, N and G wires,
 (c) coupling said RF signals from said two or more different pairs of said power line H, N and G wires to an RF receiver at a second station, and
 (d) utilizing said received RF signals.

27. The method of claim 26 wherein,
 (a) said different pairs of said power line H, N and G wire each form a two wire RF transmission line.

28. The method of claim 27 wherein,
 (a) said power line H, N and G wires are contained side by side and coextending in said power line.

29. The method of claim 28 wherein,
 (a) said power line three wire conductors are substantially electrically insulated from each other in said power line.

30. The method of claim 26 wherein,
 (a) said different pairs of power line wires include the pairs; H and G wires and the N and G wires.

31. The method of claim 26 wherein,
 (a) said different pairs of power line wires include the pairs; H and G wires, N and G wires; and H and N wires.

32. The method of claim 26 wherein,
 (a) said step of coupling RF to said power line couples said RF signals selectively to said H and N wires, or said H and G wires, or said N and G wires,
 (b) whereby operation of said PLC system is selective as to the pair of power line wires said PLC system transmits over.

33. In a power line carrier (PLC) communication system for operation on an electric power distribution system in a premises wherein said power distribution system is an alternating current (AC) system powered by a two wire source including a higher AC voltage wire (H wire), a neutral wire (N wire) and a ground wire (G wire), the method of operation including the steps of:
 (a) generating radio frequency (RF) signals at a first station,
 (b) selectively coupling said RF signals to two pairs of two or more different pairs of said power line H, N and G wires and
 (c) coupling said RF signals from said two or more different pairs of said power line H, N and G wires to an RF receiver at a second station and
 (d) said step of generating generates different phases of said RF signal,
 (e) said step of coupling RF to said power line couples one of said RF phases to said power line H and G wires and the other RF phase to said power line N and G wires and
 (f) said step of coupling RF from said power line couples said different phases to said receiver,
 (g) whereby said different RF phases are simultaneously transmitted over different RF transmission paths of said power line wires.

* * * * *